3,003,851
MANUFACTURE OF NITRIC ACID
Vernon C. Winn, Princeton, N.J., assignor to Hercules Powder Company, Wilmington, Del., a corporation of Delaware
Filed July 9, 1959, Ser. No. 826,003
1 Claim. (Cl. 23—162)

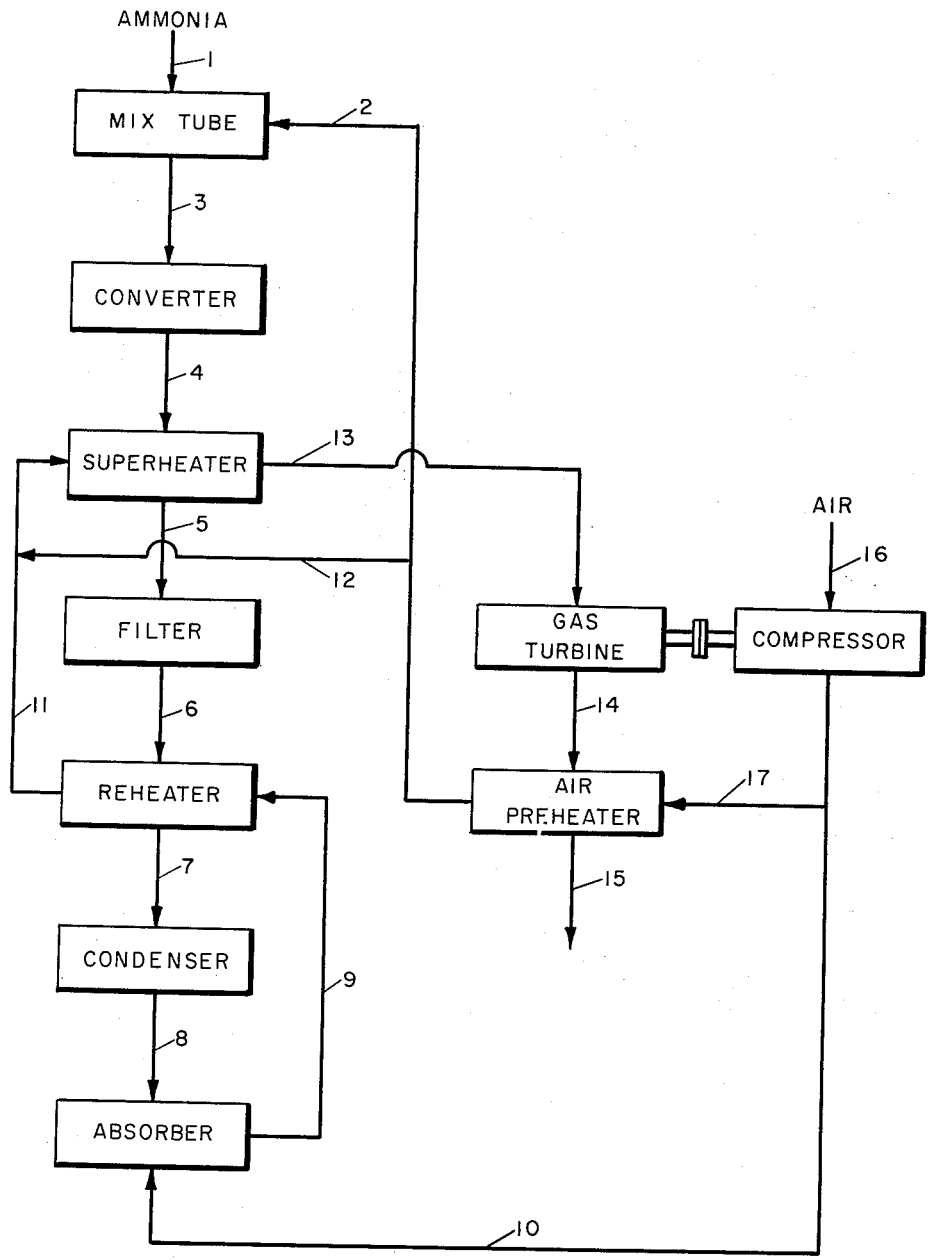

The present invention relates to an improvement in the manufacture of nitric acid from ammonia.

In one commercial process for the manufacture of nitric acid ammonia is oxidized with air under pressure and the hot gaseous products of oxidation comprising oxides of nitrogen, after being cooled first in heat-exchange apparatus and then in a condenser, are passed into an absorber in which the nitrogen oxides are absorbed in water to form nitric acid. Compressed air also is often introduced into the absorber for the purpose of bleaching the nitric acid by oxidizing nitric oxide present therein to nitrogen dioxide ($NO_2$). The compressed air required for operation of the process is conventionally supplied by a compressor which in some instances is powered by a gas turbine.

In the usual case, a portion of the energy required for operating the gas turbine, that in turn powers the compressor, is supplied by heating the spent gases from the absorber through indirect contact with the products of oxidation and then utilizing the heated spent gases for operating the turbine. It has not heretofore been possible, however, to supply in this manner all of the energy requirements of the gas turbine for the reason that there is a practical maximum limit of about 1250° F. imposed on the temperature of the gases utilizable in commercially available gas turbines, gases of higher temperature being detrimental to the materials of which such turbines are constructed. Consequently, it has been necessary to supplement the gas turbine with an auxiliary power source, such as an electric motor, to supply all the power required by the air compressor. At the optimum it has been possible to supply only about 80 to 90% of the compressor's power requirements from the gas turbine with the remainder of the requirements being met by the auxiliary power source.

It is an objective of the present invention to provide a process in which the gas turbine in a nitric acid process as above described is self-sustaining; i.e., all of the power required by the air compressor is deliverable by the gas turbine from energy recovered from the process. The invention is based on the discovery that this objective can be met by compressing an amount of air in excess of normal process requirements, augmented the spent gas stream with this excess of air and utilizing the heated mixture of the spent gas and excess air as the source of energy for the gas turbine.

Defined more precisely, the invention is an improvement in the process of making nitric acid wherein ammonia is oxidized with air under pressure, the products of oxidation are cooled and absorbed in water to form nitric acid, and the heat developed in the oxidation is recovered as energy to compress the air required for oxidation, which improvement comprises admixing with the spent gases from the absorber an amount of compressed air in excess of that required for oxidation, heating the resultant mixture of spent gases and compressed air by indirect heat exchange with the products of oxidation, and utilizing the energy in said mixture to compress the air required both for oxidation and for admixture with the spent gases.

The invention can be more specifically defined by reference to the attached drawing which is a flow sheet of the improved process. In accordance with the flow sheet, ammonia under pressure is delivered to a mix tube via line 1 and simultaneously therewith compressed air is delivered to the mix tube through line 2. The mixture of ammonia and air is then passed via line 3 to a converter wherein the mixture is oxidized to form hot, gaseous products of oxidation containing substantial quantities of oxides of nitrogen. The products of oxidation are then passed via line 4 to a superheater where they are partially cooled, thence via line 5 to a filter and from there through line 6 to a reheater where they are further cooled. From the reheater the products of oxidation, still at a relatively high temperature, are passed to a condenser via line 7 where further cooling takes place and finally they are admitted via line 8 to an absorber where they are contacted with water to form a dilute solution of nitric acid. Simultaneously air is admitted to the absorber through line 10 to effect bleaching of the nitric acid by conversion of nitric oxide to nitrogen dioxide.

The spent gases from the absorber, now at approximately room temperature, are introduced through line 9 into the reheater where they are heated by indirect contact with the products of oxidation. The partially heated spent gases are then transferred via line 11 to the superheater but just prior to their entry into the superheater they are augmented via the introduction of compressed air through line 12. In the superheater the mixture of spent gases and compressed air is further heated by indirect contact with the products of combustion and the superheated mixture of gases is then passed via line 13 as a source of energy to a gas turbine which powers an air compressor to which air is admitted from the atmosphere via line 16. The exhaust gases from the turbine pass from the line 14 to an air preheater and exit therefrom through line 15 where they exhaust to the atmosphere or, if desired, are passed to other apparatus for recovery of any energy that may remain in them. The compressed air delivered by the compressor, except that utilized to bleach the acid in the absorber, is passed through line 17 into the air preheater where it is heated by indirect contact with the exhaust gases from the gas turbine and is then split into the aforementioned streams 2 and 12.

As an illustration of the process and its practical significance the following operational example is given:

In this example the converter was of conventional design utilizing a platinum gauze catalyst. The superheater was a jacketed heat exchanger with provision for first circulating cooling gases through the jacket and then through internal heat-exchange tubes, the jacket having a total area of 555 square feet and the internal coils a total area of 3570 square feet. The reheater employed was a tubular heat exchanger having an area of 1296 square feet.

To the mix tube was delivered 63 pounds per minute of ammonia at a temperature of 180° F. and 965 pounds per minute of compressed air at 572° F. After passage through the converter there was evolved 1028 pounds per minute of gaseous products at a temperature of 1728° F. After losing some heat to the atmosphere and to cooling water surrounding the converter body, the 1028 pounds per minute of oxidation products were introduced at a temperature of 1600° F. into the superheater. In the superheater the products of oxidation were cooled to 855° F. and from there passed to the reheater. They emerged from the reheater at a temperature of 435° F. and were thence passed through the condenser and into the absorber with 155 pounds per minute of air at 185° F. being admitted simultaneously to the absorber. The spent gases leaving the absorber amounted to 895 pounds per minute at a temperature of 70° F. and after passage through the reheater were at a temperature of 570° F. The spent gases at this point were augmented by the addition of air at the rate of 280 pounds per minute at a temperature of 572° F. just prior to entry into the superheater, the gases thus entering the superheater amounting to 1175 pounds per minute at a temperature of 570° F. The spent gases were raised by passage through the superheater to a temperature of 1250° F., thus delivering to the gas turbine 1175 pounds per minute of gases having a temperature of 1250° F. The exhaust gases from the turbine having the same mass but reduced to a temperature of 750° F. were passed to the preheater (a tubular heat exchanger having an area of 2850 square feet) where they were further cooled to 355° F. by indirect contact with 1245 pounds per minute of compressed air at 185° F. from the compressor, while the compressed air was heated to 572° F. An additional 155 pounds per minute of compressed air at 185° F. bypassed the preheater for use as previously described. Thus, a total of 1400 pounds per minute of air was compressed to meet the demands of the process and throughout the operation no auxiliary power source was required. This level of work by the compressor required 4190 horsepower which is well within the capability of an efficient gas turbine operating on 1175 pounds per minute of gases at 1250° F.

In accordance with prior art procedure, the gas turbine and compressor combination cannot be operated on a self-sustained basis. This will be apparent from the fact that had not the spent gases been augmented by compressed air in the preceding example, their mass would have amounted to 895 pounds per minute and at the practical temperature limit of 1250° F. the maximum horsepower that could be developed by any of the known gas turbines is about 3265, which is considerably less than the 3360 horsepower that would be required by an efficient compressor to compress 1120 pounds per minute of air (1400 pounds per minute minus 280 pounds per minute) which is the amount that would be needed for oxidation.

It is clear from the preceding description that there are many modifications that can be made in the invention by persons skilled in the art without departing from the spirit and scope of the invention. For instance, the spent gas stream can be augmented with excess compressed air at a different stage of the process; for example, the excess air may be introduced into the spent gas prior to its entry into the reheater or, if desired, it can be added to the spent gas stream at more than one point in the process.

The essence of the invention relates, of course, to the compression of excess air and its addition to the spent gases in an amount that will provide a mixture containing sufficient energy to compress all of the air required for the entire process. The amount of excess air to be so compressed is obviously variable according to the type of equipment and the process conditions but as a general rule the excess air required will be about 20 to 45% of the spent gases by weight.

What I claim and desire to protect by Letters Patent is:

In the process of making nitric acid wherein ammonia is oxidized with air under pressure, the products of oxidation are cooled and absorbed in water to form nitric acid, and the heat developed in the oxidation is recovered as energy to compress the air required for oxidation, the improvement which comprises admixing with the spent gases from the absorber an amount of compressed air between about 20% and about 45% by weight of said spent gases, heating the resultant mixture of spent gases and compressed air by indirect heat exchange with the products of oxidation, and utilizing the energy in said mixture to compress the air required both for oxidation and for admixture with the spent gases.

References Cited in the file of this patent
UNITED STATES PATENTS
2,031,215    Hobler _____ Feb. 18, 1936
OTHER REFERENCES
Strelzoff: "Chemical Engineering," vol. 63, pages 170–174, May 1956.